US012783575B2

(12) United States Patent
Cutello

(10) Patent No.: US 12,783,575 B2
(45) Date of Patent: Nov. 3, 2026

(54) METHODS AND SYSTEMS FOR AUTOMATED GENERATION OF DIGITAL ARTIFACTS WITH ENHANCED USER EXPERIENCE

(71) Applicant: PastBook BV, Amsterdam (NL)

(72) Inventor: Stefano Cutello, Amsterdam (NL)

(73) Assignee: PastBook BV, Amsterdam (NL)

( * ) Notice: Subject to any disclaimer, the term of this patent is extended or adjusted under 35 U.S.C. 154(b) by 0 days.

(21) Appl. No.: 18/538,712

(22) Filed: Dec. 13, 2023

(65) Prior Publication Data

US 2024/0370488 A1 Nov. 7, 2024

Related U.S. Application Data

(63) Continuation of application No. PCT/EP2021/067751, filed on Jun. 28, 2021.

(Continued)

(51) Int. Cl.
*G06F 3/04845* (2022.01)
*G06F 16/58* (2019.01)
(Continued)

(52) U.S. Cl.
CPC ...... *G06F 16/5854* (2019.01); *G06F 16/5866* (2019.01); *G06F 16/587* (2019.01)

(58) Field of Classification Search
USPC ................. 382/100–103, 115–119, 154–305; 704/1–275; 706/1–62, 900–903
See application file for complete search history.

(56) References Cited

U.S. PATENT DOCUMENTS 11,093,112 B2 * 8/2021 Belhumeur ............. G06F 16/50
2014/0193047 A1 7/2014 Grosz et al.

(Continued)

FOREIGN PATENT DOCUMENTS

WO WO-2022263007 A1 12/2022

OTHER PUBLICATIONS

PCT/EP2021/067751 International Preliminary Report on Patentability dated Dec. 14, 2023.

(Continued)

*Primary Examiner* — Marcellus J Augustin
(74) *Attorney, Agent, or Firm* — Wilson Sonsini Goodrich & Rosati

(57) ABSTRACT

A method and system are described to facilitate the generation, and/or presentation, of digital artifacts, to a client device associated with a user. Metadata is extracted from a plurality of digital items; a subset of the digital items is selected based at least in part on the extracted metadata; the subset is filtered based at least in part on a predetermined rule; a parameter is estimated that is associated with a set of resulting digital items for the digital artifact; the filtered subset of digital items filtered is decimated based at least in part on the parameter and a respective quality assessment of each of the filtered subset of digital items; and the digital artifact is generated by arranging a remainder of digital items from the plurality of digital items based at least in part on a preselected layout, and presenting the digital artifact to a user on a display of the user device, wherein a subset of the digital artifact generated in is presented to the user prior to completion of the generation.

22 Claims, 8 Drawing Sheets

Related U.S. Application Data

(60) Provisional application No. 63/212,549, filed on Jun. 18, 2021.

(51) Int. Cl.

| | |
|---|---|
| ***G06F 16/583*** | (2019.01) |
| ***G06F 16/587*** | (2019.01) |
| ***G06F 18/25*** | (2023.01) |

(56) References Cited

U.S. PATENT DOCUMENTS

| | | | | |
|---|---|---|---|---|
| 2015/0363409 | A1 | 12/2015 | Wood et al. | |
| 2016/0132194 | A1 * | 5/2016 | Grue | G06F 16/58 715/810 |
| 2021/0048965 | A1 * | 2/2021 | Frieder | H04W 4/021 |

OTHER PUBLICATIONS

PCT/EP2021/067751 International Search Report and Written Opinion dated Mar. 2, 2022.
EP21737620.1 Summons to Attend Oral Proceedings dated Jun. 30, 2026.

* cited by examiner

METHODS AND SYSTEMS FOR AUTOMATED GENERATION OF DIGITAL ARTIFACTS WITH ENHANCED USER EXPERIENCE

CROSS-REFERENCE

This application is a continuation of International Application No. PCT/EP2021/067751, filed Jun. 28, 2021, which claims the benefit of U.S. Provisional Patent Application No. 63/212,549, filed Jun. 18, 2021, which application is incorporated herein by reference.

BACKGROUND

A computer system may facilitate the generation, and/or presentation, of digital artifacts, to a client node or client device associated with a user. In some instances, the generation of digital artifacts may be based at least in part on information associated with the user.

SUMMARY

Recognized herein is a need for a computer system to generate digital artifacts from digital items (e.g., photos, images, pictures, videos, text files, etc.) automatically with little or no user interaction or input. Nowadays, most smart phones are equipped with a digital camera. Generating a digital item is a relatively easy and cheap task and thus may lead users to generate abundant digital items. However, these abundant digital items may not provide a user with a meaningful representation of the contents of the digital items due to the excessive number of them. For example, a user may take multiple shots of the same scene in the hope of getting one best photo. It is a time and labor consuming task to sort these photos to determine which one(s) to keep. In another example, a user may generate thousands of digital items during an exciting trip, and some of them is not necessarily related to the trip (e.g., a screenshot of a work email, or a friend's wedding picture received via text message during the trip). In this case, if the user would like to generate a group of photos or a photobook to represent the story of the trip, iterative operations are needed to select the meaningful photos and arrange them in a suitable layout. This can be a very time-consuming task and may prevent users from generating a digital artifact.

Beneficially, provided herein is a system automatically generates digital artifacts from digital items with little or no user interaction. For example, the system may look up locally-saved images that are taken in a particular timeframe and/or at a particular location-area, and may utilize an algorithm to determine whether there is a potential story associated with these images. If so, the system may then initiate a task to generate a digital artifact (e.g., a photo book) for the user. A number of algorithms may be employed to generate a photobook that can meaningfully represent the story and narrative of a set of photos. For example, a trained machine learning (ML) algorithm may be employed to: determine whether there should be a photobook based on a detected set of photos; decimate repetitive photos, filter out unrelated photos, select photos that may represent the trip story, arrange the selected photos in a manner that may tell the story in a meaningful way (e.g., arrange the photos in a chronological order). This process of generating the photobook requires little or no user input and thus is very user friendly. In some other scenarios, the user may initiate the creation of a digital artifact by a minimal user input, such as by choosing a timeframe and/or location associated with photos. The system may then start to create a photobook by first determining a theme for the photo book. In these scenarios, the ML algorithm may generate the photobook in an incremental manner, and present the user with a subset of the generated photobook to entertain the user. This may enhance a user experience by allowing the user to observe the photobook generation process in real-time. The ML algorithm may be trained continuously or periodically when generating a digital artifact. Beneficially, the ML algorithm may perform the creation of a digital artifact locally without the need to connect to Internet. This may allow users to protect their privacy because the source digital items do not need to be uploaded to a cloud server.

In an aspect, the present disclosure provides a method for generating a digital artifact, the method comprising: (a) extracting, by one or more computer processors of a user device, metadata from a plurality of digital items; (b) selecting, by the one or more computer processors, a subset of digital items from the plurality of digital items based at least in part on the extracted metadata; (c) filtering, by the one or more computer processors, the subset of digital items based at least in part on a predetermined rule; (d) estimating, by the one or more computer processors, a parameter associated with a set of resulting digital items for the digital artifact; (e) decimating, by the one or more computer processors, the subset of digital items filtered in (c), based at least in part on the parameter associated with the set of resulting digital items and a respective quality assessment of each of the filtered subset of digital items; and (f) generating, by the one or more computer processors, the digital artifact by arranging a remainder of digital items from the plurality of digital items based at least in part on a preselected layout, and presenting the digital artifact to a user on a display of the user device, wherein a subset of the digital artifact generated in (f) is presented to a user on the user device prior to a completion of (f).

In another aspect, the present disclosure provides a computer system for generating digital artifact, the computer system comprises one or more processors, individually or collectively, configured to (a) extract metadata from a plurality of digital items; (b) select a subset of digital items from the plurality of digital items based at least in part on the extracted metadata; (c) filter the subset of digital items based at least in part on a predetermined rule; (d) estimate a parameter associated with a set of resulting digital items for the digital artifact; (e) decimate the subset of digital items filtered in (c), based at least in part on the parameter associated with the set of resulting digital items and a respective quality assessment of each of the filtered subset of digital items; and (f) generate the digital artifact by arranging a remainder of digital items from the plurality of digital items based at least in part on a preselected layout, and present the digital artifact to a user on a display of the user device, wherein a subset of the digital artifact generated in (f) is presented to a user on the user device prior to a completion of (f).

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
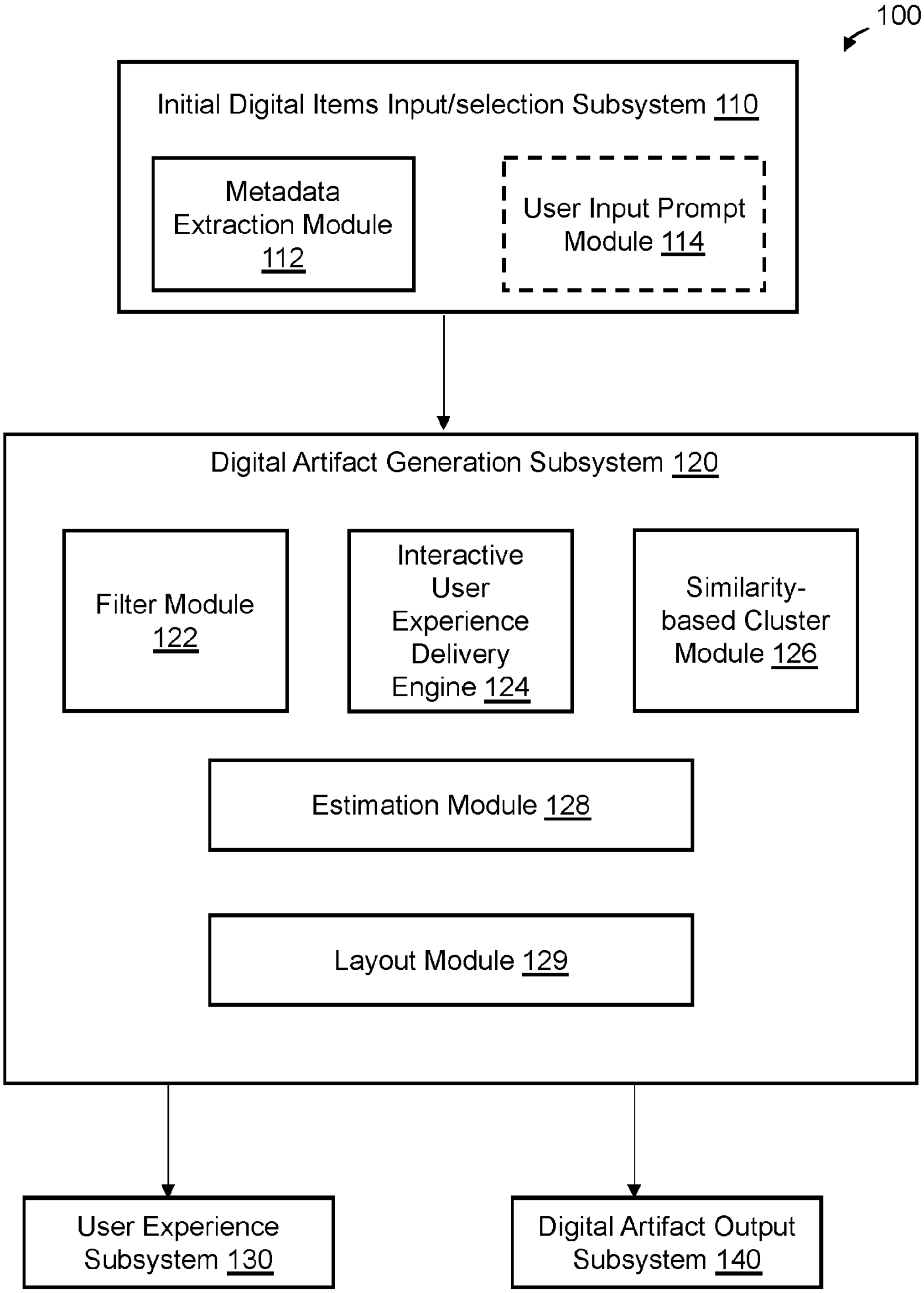
FIG. 1 illustrates a block diagram depicting an example system 100, according to embodiments of the present disclosure, comprising an architecture configured to perform the various methods described herein.

FIG. 1 illustrates a block diagram depicting an example system 100 comprising an architecture configured to perform the various methods described herein. The system 100 may have an initial digital items input/selection subsystem 110, a digital artifact generation subsystem 120, a user experience system 130, and a digital artifact output subsystem 140.

The initial digital items input/selection subsystem 110 may select a set of digital items (e.g., photos, images, pictures, videos, text files, etc.) as input to subsequent components or subsystems. In some embodiments, the initial digital items input/selection subsystem 110 may automatically select a number of digital items based on a predetermined criterion, or a predetermined set of criteria. In these cases, the initial digital items input/selection subsystem 110 may extract metadata (e.g., geo-locations, timestamps, etc.) associated with digital items by utilizing a metadata extraction module 112. For example, the initial digital items input/selection subsystem 110 may automatically select a number of digital items that are generated/created within a time frame (e.g., photos shot between June 1 to June $30^{th}$ of the year of 2020). In another example, the initial digital items input/selection subsystem 110 may automatically select a number of digital items that are generated/created at a location (e.g., photos shot at Boston, MA). In yet another example, the initial digital items input/selection subsystem 110 may automatically select a number of digital items that meet a predetermined set of criteria, such as photos shot at Boston, MA between June 1 to June $30^{th}$ of the year of 2020. In these cases, user interaction is not mandatory and, if included, can be very lightweight. In some cases, the method can be performed in absence of user input. In some cases, the user may not provide any input regarding the predetermined criterion or set of criteria. In some cases, as described elsewhere herein, the user may provide input on the selection, or criteria or parameter thereon, such as by providing instruction prior to and/or providing feedback on the product of an automated selection process. While some examples of automatically selecting digital items are provided, it will be appreciated that other forms and/or criteria of automatically selecting digital items may be utilized to facilitate the digital items selection operation.

Alternatively or additionally, the initial digital items input/selection subsystem 110 may further include a user input prompt module 114. The user input prompt module 114 may prompt user input to select digital items. For example, the user input prompt module 114 may present a list of queries to a user, such as a time range, a geographic area, a device digital items album, a video clip, and/or a generic set of digital items. In some embodiments, a user may manually select parameters to one or more of the queries in the list. For example, a user may manually select Boston, MA as the geographic area that an artifact of digital items is to be generated. In some other embodiments, a user may be presented with suggested parameters for one or more of the queries in the list. For example, the user input prompt module 114 may present a question to the user, which may read as "would you like a photo book to be generated for your trip to Boston in June 2020?" This may minimize user interaction in initiating the generation of an artifact, which enhances a user experience because a user does not need to manually select each digital items that is a potential candidate for the digital artifact.

In some embodiments, the initial digital items input/selection subsystem 110 may sort the digital items. For example, the initial digital items input/selection subsystem 110 may sort the digital items based on an acquisition time. This operation may allow the generated artifact to represent a story that is a chronological list of events.

In at least some examples, the digital artifact generation subsystem 120 may be one or more computing devices or systems, storage devices, and other components that include, or facilitate the operation of, various execution modules depicted in FIG. 1. These modules may include, for example, a filter module 122, an interactive user experience delivery engine 124, a similarity-based cluster module 126, an estimation module 128, and a layout module 129. Each of these modules is described in greater detail below.

The filter module 122 may receive the initial set of digital items (e.g., candidate digital items) from the initial digital items input/selection subsystem 110. In some embodiments, the filter module 122 may filter out (e.g., remove) digital items that are not unusable based on a set of rules. The filter module 122 may filter the initial set of digital items based on the technical features associated with these digital items. For example, if a digital item is corrupted, then it may be filtered out from the initial set of digital items. In another example, if the digital item is a photo, and the photo has insufficient resolution, then this photo will be discarded by the filter module 122.

In some embodiments, alternatively or subsequently, the filter module 122 may filter the digital items based on the metadata associated with the digital items. Digital items that have been obtained from a source that is not desired to be a candidate to the resulting artifact may be filtered out based on the metadata associated with the digital items. For example, if the metadata associated with a digital item indicates that this digital item is received via a communication channel (e.g., via instant-messaging or media sharing application) instead of being produced locally by a user device, then the filter module 122 may discard this digital item. This will allow the resulting artifact to focus on the story of this particular user associated with the user device, and filter out digital items (e.g., shared photos) received from another user (e.g., a friend). In some embodiments, the filter module 122 may prompt a question to the user and ask whether to keep the digital items received from another source in this artifact. The response of the user may be labelled, and eventually become a tuning or training example for a machine learning (ML) model. For example, if a user is generating an artifact (e.g., a photo book) showing a story about a past trip, then generally the user does not want a photo of a friend's wedding received, during the time of the past trip, from a social media to be included in the resulting artifact. However, if a user is generating an artifact showing a story about the friendship between the user and a close friend, then generally the photos received via instant-messaging or photo-sharing application are desired to be included in the resulting artifact. Overtime, the ML model may be able to make the determination based on the theme or purpose of the artifact, and no user input is needed.

In some embodiments, alternatively or subsequently, the filter module 122 may filter the digital items based on pixel statistics associated with the digital items. In some embodiments, when the digital items are photos, the filter module 122 may extract statistics of the photos to analyze the pixel quality of the photos, such as brightness and/or contrast. When the brightness and/or contrast of a photo is outside of a predetermined threshold range, the filter module 122 may discard this photo.

In some embodiments, alternatively or subsequently, the filter module 122 may filter the digital items based on the indices estimated on the digital items (e.g., pictures or photos). The specific operations of filtering the digital items based on indices estimated on the digital items are described in more details with reference to the content indices filter component 510 of FIG. 5.

In some embodiments, alternatively or subsequently, the filter module 122 may filter the digital items based on the content semantic associated with the digital items. The specific operations of filtering the digital items based on content semantic associated with the digital items are described in more details with reference to the content semantic filter component 514 of FIG. 5.

The digital artifact generation subsystem 120 may also include a similarity-based cluster module 126. Nowadays, the generation of digital items are convenient with low cost (such as shooting a photo with a mobile device), it is common for a user to generate a number of similar digital items of the same scene (e.g., multiple shots taken to ensure one of them with good quality). The similarity-based cluster module 126 may identify digital items that are similar or near-similar to each other. Further, the similarity-based cluster module 126 may select one or more of the digital items representing the entire cluster and discard all the other digital items. The specific operations of the similarity-based cluster module 126 are described in more details with reference to FIG. 6.

The digital artifact generation subsystem 120 may also include an estimation module 128. In some embodiments, the estimation module 128 may automatically estimate a plurality of quantities for the generated artifacts and tune a plurality of parameters. For example, the estimation module 128 may estimate the number of pictures retained by the filter module 122, and the needed number of picture-per-page (PPP) to reach the desired number of pages (e.g., in the case where the digital artifact is a photo book). In some embodiments, some of these exemplary quantities may not be a fixed number, but instead is in a probabilistic sense. For example, instead of a fixed number of PPP to generate a uniform photo book, the estimation module 128 may estimate a distribution parameter to draw this quantity (e.g., if the generated photo book is 10 pages in total, then 5 photos per page is desired; if the generate photo book is 7 pages in total, then 7 photos per page is desired). In some embodiments, these stochastic quantities can be managed to have controlled probabilistic properties, such as a fixed mean, to control the overall properties of the generated artifact. These estimations can be obtained by means of prior distributions, statistics computed during an incremental process itself, and options selected a-priori, from the user, or automatically or dynamically tuned. The desired number of pages may be computed (e.g., estimated by the estimation module 128) as a function of the estimated final number of retained pictures. The estimated final number of retained pictures may also be used to estimate the percentage of pictures to be removed by a decimation function of the estimation module 128.

In some embodiments, the estimation module 128 may also generate mini-stories for an artifact. Mini-stories are sub-sequences of pictures related to the same situation. Similarly to near-similarity clusters, those clusters can be created incrementally. In some cases, at this stage, near-similar pictures are no longer present. The mini-stories clustering can be obtained by means of ML models trained to distinguish between picture-pairs belonging to the same mini-story, and picture-pairs related to different mini-stories. Mini-stories can be needed for decimation and layout operation when creating a photo book.

In some embodiments, the estimation module 128 may perform a decimation function. In some embodiment, pictures decimation function is an operation that allows to reduce the number of pictures used for the digital artifact. The estimation module 128 may continuously tune parameters to perform this decimation function. Pictures related to the same mini-story cluster can be pruned by selecting those that have the best characteristics, thus considered technically and aesthetically better than others. A ranking of the mini-stories can allow the selection of a subset of pictures according to the desired percentage of pictures to be retained. The ranking of pictures can be obtained by means of a binary predicate, as described elsewhere herein. The considered features can be indices such as those used by the filter module 122, and per-class classification probabilities can be similar to those computed for similarity-based cluster module 126 and highlights for the interactive user experience delivery engine 124.

In some embodiments, the estimation module 128 may select a key picture to be the cover in the case the generated artifact is a photo book. A digital artifact can be represented by one or more key pictures and the key picture(s) may be used for a cover for a photo book. The selection of cover pictures can be based on both technical, aesthetic picture quality and picture content. An algorithm, such as a ML model, may select the best and most meaningful key pictures by ranking the existing pictures. This binary classification model can be trained on multiple user annotated samples to capture the content-to-cover affinity. This model can be based on features extracted from picture content and metadata, such as estimated indices and classification probabilities. Specific patterns such as faces or others may be manually, dynamically or automatically tuned based on, for example, the detected content/theme of the digital artifact being created. This operation may be used to better capture the mean user preferences, and may be used to improve the ML or binary classification model.

In some embodiments, when the generated artifact is a photo book, the estimation module 128 may estimate the number of pictures to insert in this photobook, and the number of pictures in a page of the photobook. This estimation may be driven by both mini-story clusters, and pseudo-randomness. Boundaries between mini-stories can be used to prevent clashing of different experiences in the same page. The randomness can create some jitter in the structure of the book. In some embodiments, the randomness can be controlled and deterministic, allowing to keep the book generation process predictable. The maximal number of pictures-per-page can be determined by the algorithm parameterization of the estimation module 128. These probability distributions can be generated adaptively, during the generation process. This allows to fine-tune the parameters as more data become available.

In some embodiments, the digital artifact generation subsystem 120 may also include an interactive user experience delivery engine 124. In some embodiments, during the time other components of the digital artifact generation subsystem 120 are producing the digital artifact, the interactive user experience delivery engine 124 may deliver a subset of the generated digital artifact to the user. This may enable the users to entertain themselves and may prompt some user input. In some embodiments, the interactive user experience delivery engine 124 may produce metadata highlights from the analyzed set of pictures, in which the metadata highlights are metadata capturing high-level picture semantics. For example, a subset of the incrementally generated digital artifact may represent a key piece of the story represented by the digital artifact, and this subset of the incrementally generated digital artifact may be presented to the user while the user waits for the completion of the digital artifact generation. This may entertain the user during the digital artifact generation process and thus make the user perceive a real-time or near real-time digital artifact generation. In some embodiments, the interactive user experience delivery engine 124 may solicit user interaction when presenting a subset of the digital artifact to the user. For example, the interactive user experience delivery engine 124 may ask questions when presenting a subset of the digital artifact to the user and solicit a response from the user. These questions allow to obtaining data that are useful to dynamically adapt the algorithm parameters to a specific user, for the user's actual digital artifact being created but also to automatically tailor a personalization in future ones. These data can be collected to get better results not only for the current user but also for the update of shared models used for other users. The interactive user experience delivery engine 124 may interact with the user through a user experience subsystem 130. The user experience subsystem 130 may receive questions from the interactive user experience delivery engine 124 and then present to the user. In some other embodiments, the user experience subsystem 130 may receive the subset of the digital artifact from the interactive user experience delivery engine 124 and then present to the user.

In some embodiments, the digital artifact generation subsystem 120 may also include a layout module 219. The layout module 219 may select or generate a set of layouts, place the digital items in the layout places (e.g., a plurality of layout places in each of the layouts), and chop the digital items to fit in the layout places. The specific operations of digital items layout are described in more details with reference to FIG. 7A and FIG. 7B.

The system 100 may also include a digital artifact output subsystem 140. In some embodiments, the digital artifact output subsystem 140 may be a visualization device, such as a computer screen, a monitor, or a smart phone screen, etc. In some other embodiments, the digital artifact output subsystem 140 may be linked to a printing and delivery service to provide a hardcopy of the generated artifact to a user.

The subsystems of FIG. 1 and their components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the subsystems. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

Figure 2:
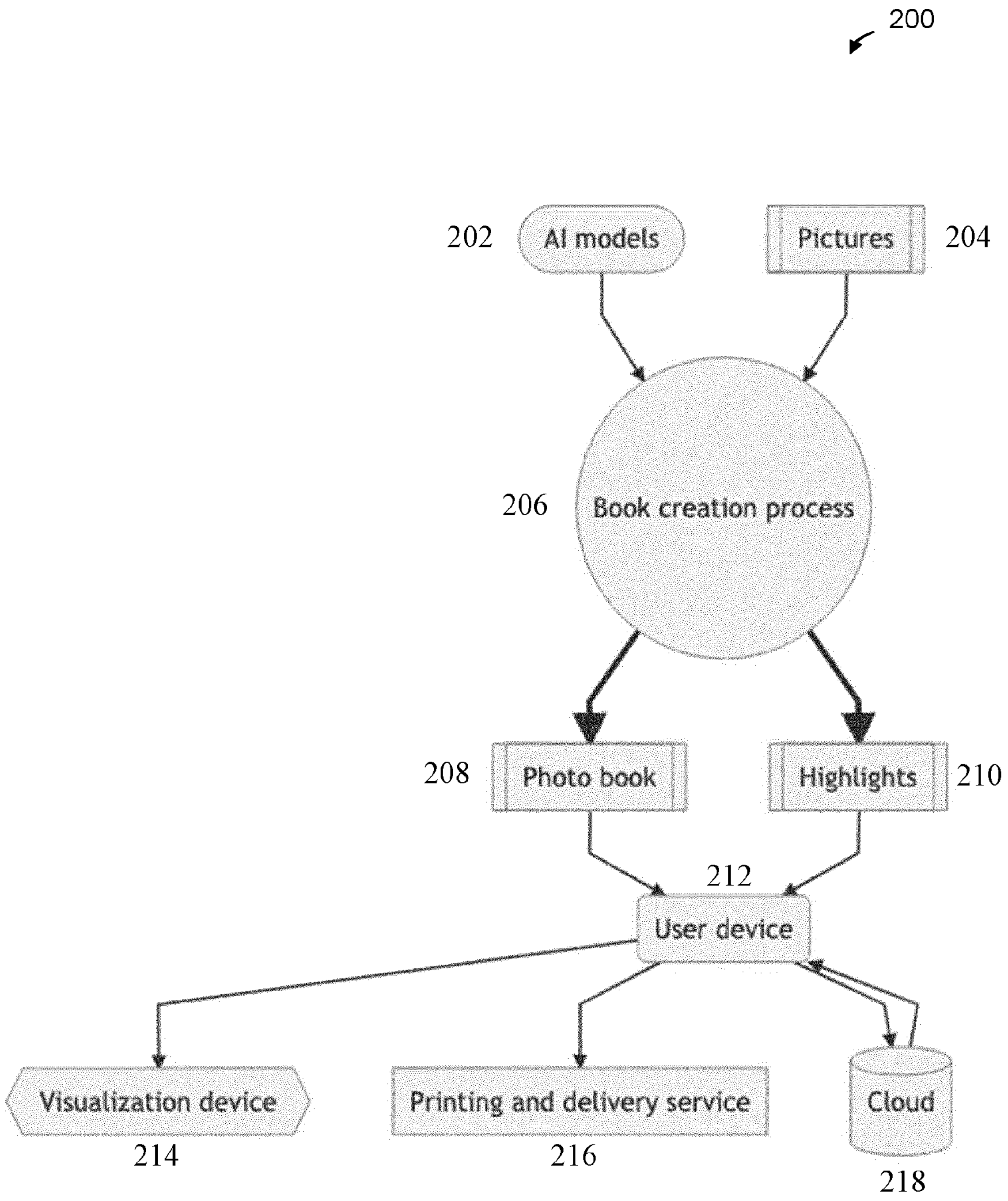
FIG. 2 illustrates a block diagram depicting an example system 200 for automatically generating a digital artifact with enhanced user experience, according to embodiments of the present disclosure.

FIG. 2 illustrates a block diagram depicting an example system 200 for automatically generating a digital artifact with enhanced user experience, according to one exemplary embodiment. As depicted in FIG. 2, Artificial Intelligence (AI) models module 202 and a pictures input module 204 interact with the book creation process module 206 to automatically generate a digital artifact and feed the digital artifact or a subset of the digital artifact to a photo book module 208 or a highlights user experience module 210. In some embodiments, the AI models module 202 may be a cloud-based module, and it may choose one or more suitable models, based at least in part on, the particular task being performed, to interact with the book creation process module 206. In some other embodiments, the AI models module 202 may be local to the book creation process module 206, which may be implemented in the user device 212, to perform the book creation operations. In some embodiments, the pictures input module 204 may be a cloud-based module, and it may interact with Internet-features platforms to choose a number of pictures as input. For example, the pictures input module 204 may interact with a social media platform (such as Facebook, Instagram, etc.) to choose a number of pictures. In some other embodiments, the pictures input module 204 may be local to the user device 212. For example, the pictures input module 204 may choose a number of pictures from the local photo storage of the user device 212. The photo book module 208 and the highlights user experience module 210 may provide input to user device 212, which further communicates with a visualization device 214 to present a visualization of the digital artifact or a subset of the digital artifact to a user. In some embodiments, the user device 212 may transmit the digital artifact or a subset of the digital artifact to a printing and delivery service module 216 to print a hard copy of the digital artifact. In some other embodiments, the user device 212 may communicate with a cloud server 218.

Figure 3:
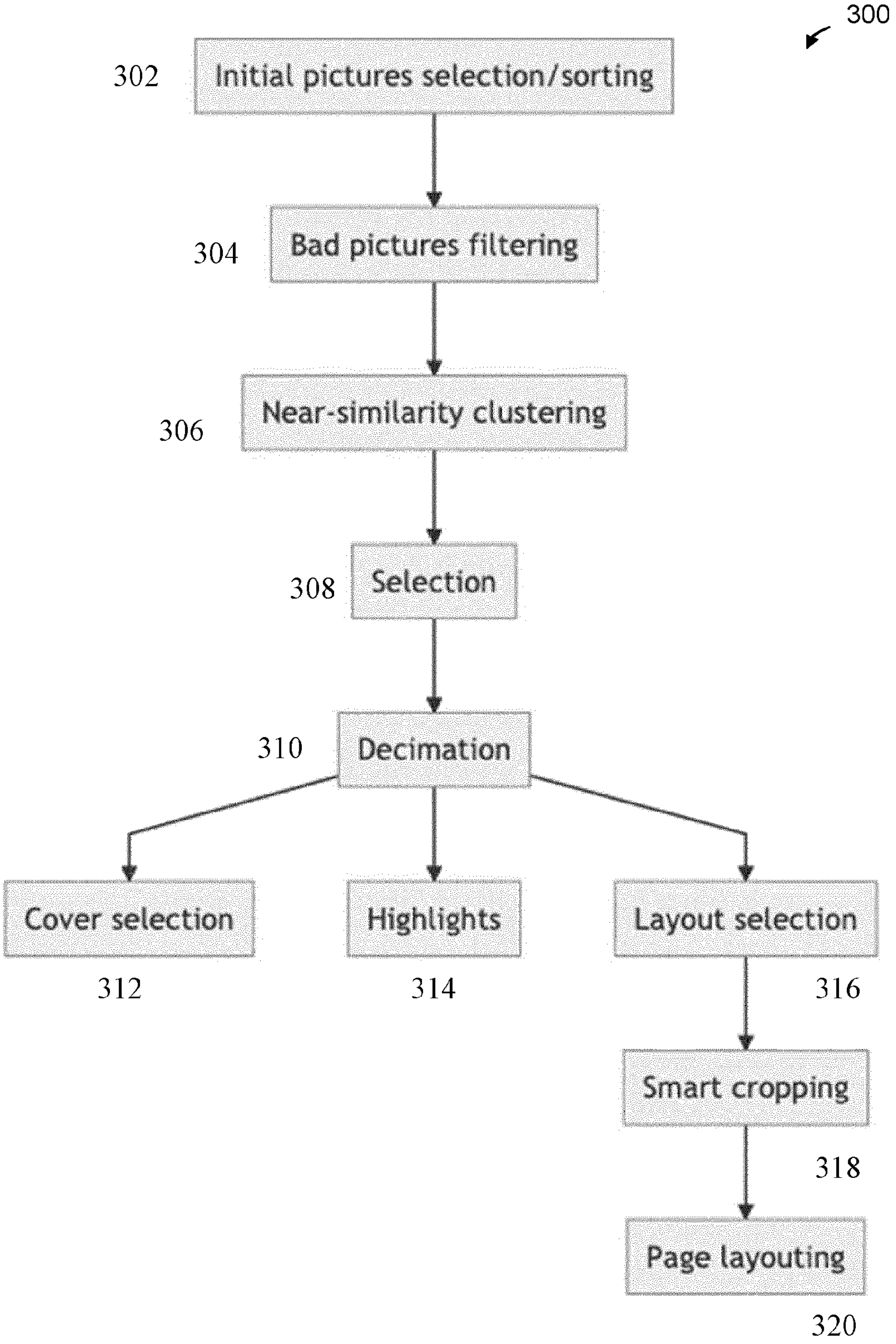
FIG. 3 illustrates a flow diagram depicting an example process 300 for automatically generating a digital artifact with enhanced user experience, according to embodiments of the present disclosure.

FIG. 3 illustrates a flow diagram depicting an example process 300 for automatically generating a digital artifact with enhanced user experience, according to one exemplary embodiment. As depicted in FIG. 3, once the platforms and systems of the present disclosure is initialized, the process 300 begins with operation 302, wherein the system 100 performs initial pictures selection and sorting. In some embodiments, the initial digital items input/selection subsystem 110 of system 100 (see 110 of FIG. 1) may perform the initial selection and/or sorting operation 302 by selecting a set of pictures based on a first set of predetermined criteria and sorting this set of pictures based on a second set of predetermined criteria. The specific steps of operation 302 is described in more details with reference to FIG. 4, and the initial digital items input/selection subsystem 110 of FIG. 1. Once an initial set of input pictures are selected and/or sorted in operation 302, the process 300 proceeds to operation 304, wherein the system 100 filters (e.g., removes) bad or unusable pictures. Next, the process 300 may proceed to operation 306, wherein the similarity-based cluster module 126 of the system 100 performs a similarity-based clustering of the digital items. The generation of digital items are convenient with low cost (such as shooting a photo with a mobile device), it is common for a user to generate a number of similar digital items of the same scene (e.g., multiple shots taken to ensure one of them with good quality). The similarity-based cluster module 126 may identify digital items that are similar or near-similar to each other. The specific operations of the similarity-based cluster operation 306 are described in more details with reference to FIG. 6. Next, the process 300 proceeds to operation 308, wherein one or more of the digital items representing the entire similarity-based cluster may be selected, and others may be discarded. In some embodiments, the similarity-based cluster module 126 may select only one digital item to represent the entire cluster. In some other embodiments, the similarity-based cluster module 126 may select more than one digital items to represent the entire cluster. The specific operations of the selection operation 308 are described in more details with reference to FIG. 6. Next, the process 300 proceeds to operation 310, wherein the estimation module 128 of the system 100 may estimate the number of the digital items that will be retained to generate the digital artifact and decimate the rest of the digital items. The specific operations of the estimation and decimation operation 310 are described in more details with reference to the estimation module 128 of FIG. 1. After the estimation and decimation operation 310, the process 300 may proceed to operation 312, wherein the system 100 may select a cover for the generated digital artifact. In some embodiments, a ML algorithm may be employed to select the best and most meaningful key pictures by ranking the existing pictures. The specific operations of the cover selection operation 312 are described in more details with reference to the estimation module 128 of FIG. 1. In parallel with operation 312, the process 300 may also provide highlights and entertainments to a user in operation 314. In some embodiments, the process 300 may provide the user entertainments and highlight operation 314 in parallel to all the other operations, such as in parallel to operations 302, 304, 306, 308, 310, 312, 316, 318, and 320. User entertainments and highlight operation 314 may present a subset of the remaining digital items and/or a subset of the generated artifact to a user during the digital artifact generation process. This may enable the users to entertain themselves and may prompt some user input. The specific operations of the user entertainments and highlight operation 314 are described in more details with reference to the interactive user experience delivery engine 124 and the user experience subsystem 130 of FIG. 1. In parallel with operations 312 and 314, the process 300 may also proceed to layout selection operation 316, wherein the system 100 may select or generate a set of layouts to create the digital artifact. Next, the process 300 may proceed to smart chopping operation 318 and page layouting operation 320. The specific operations of the layout selection operation 316, the smart chopping operation 318, and the page layouting operation 320 are described in more details with reference to FIG. 7A and FIG. 7B.

Figure 4:
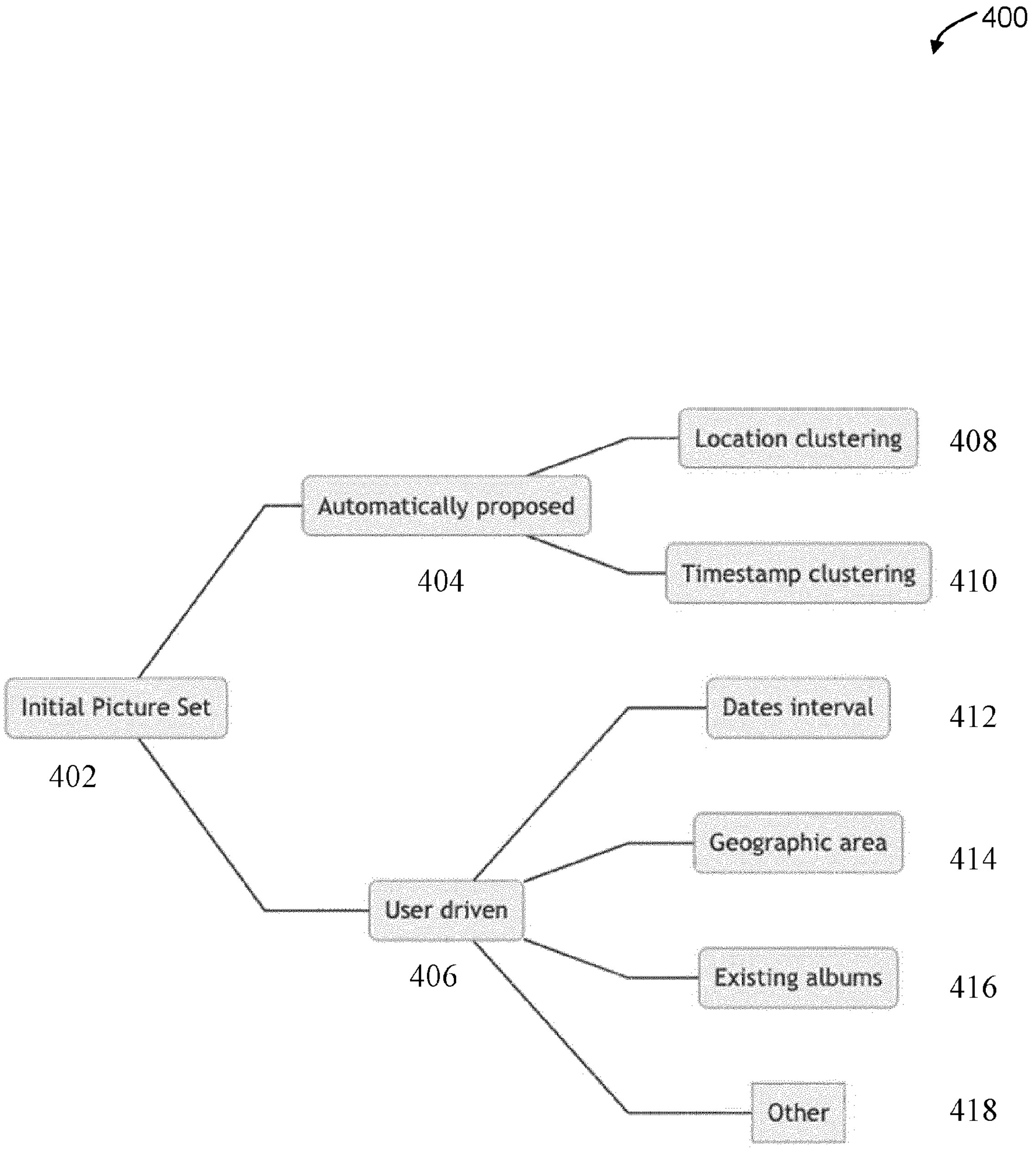
FIG. 4 illustrates a block diagram depicting an example system 400 for initial selection of digital items for automatically generating a digital artifact with enhanced user experience, according to embodiments of the present disclosure.

FIG. 4 illustrates a block diagram depicting an example system 400 for initial selection of digital items for automatically generating a digital artifact with enhanced user experience, according to one exemplary embodiment. As depict in FIG. 4, an initial picture set 402 may be received/discovered by the platforms or systems of the present disclosure. An automatically proposed module 404 may propose a selection of the digital items (e.g., photos, images, pictures, videos, text files, etc.) based on a predetermined criterion, or a predetermined set of criteria. For example, a location clustering module 408 may automatically select a number of digital items that are generated/created at a location (e.g., photos shot at Boston, MA). In another example, a timestamp clustering module 410 may automatically select a number of digital items that are generated/created within a time frame (e.g., photos shot between June 1 to June 30$^{th}$ of the year of 2020). In yet another example, the location clustering module 408 and the timestamp clustering module 410 may collaborate and automatically select a number of digital items that meet a predetermined set of criteria, such as photos shot at Boston, MA between June 1 to June 30$^{th}$ of the year of 2020. While some examples of automatically selecting digital items are provided, it will be appreciated that other forms and/or criteria of automatically selecting digital items may be utilized to facilitate the digital items selection operation. Alternatively or additionally, a user-driven module 406 may prompt user input to select digital items. For example, the user-driven module 406 may present a list of queries to a user, such as a time interval 412 (e.g., time range), a geographic area 414, an existing album 416 (e.g., digital item album in a user device), a video clip, and/or a generic set of digital items. In some embodiments, a user may manually select parameters to one or more of the queries in the list. For example, a user may manually select Boston, MA as the geographic area that an artifact of digital items is to be generated. In some other embodiments, a user may be presented with some suggested parameters to one or more of the queries in the list. For example, the user-driven module 406 may present a question to the user, which may read as "would you like a photo book to be generated for your trip to Boston in June 2020?" This may minimize user interaction in initiating the generation of an artifact, which enhances a user experience because a user does not need to manually select each digital items that is a candidate for the artifact.

Figure 5:
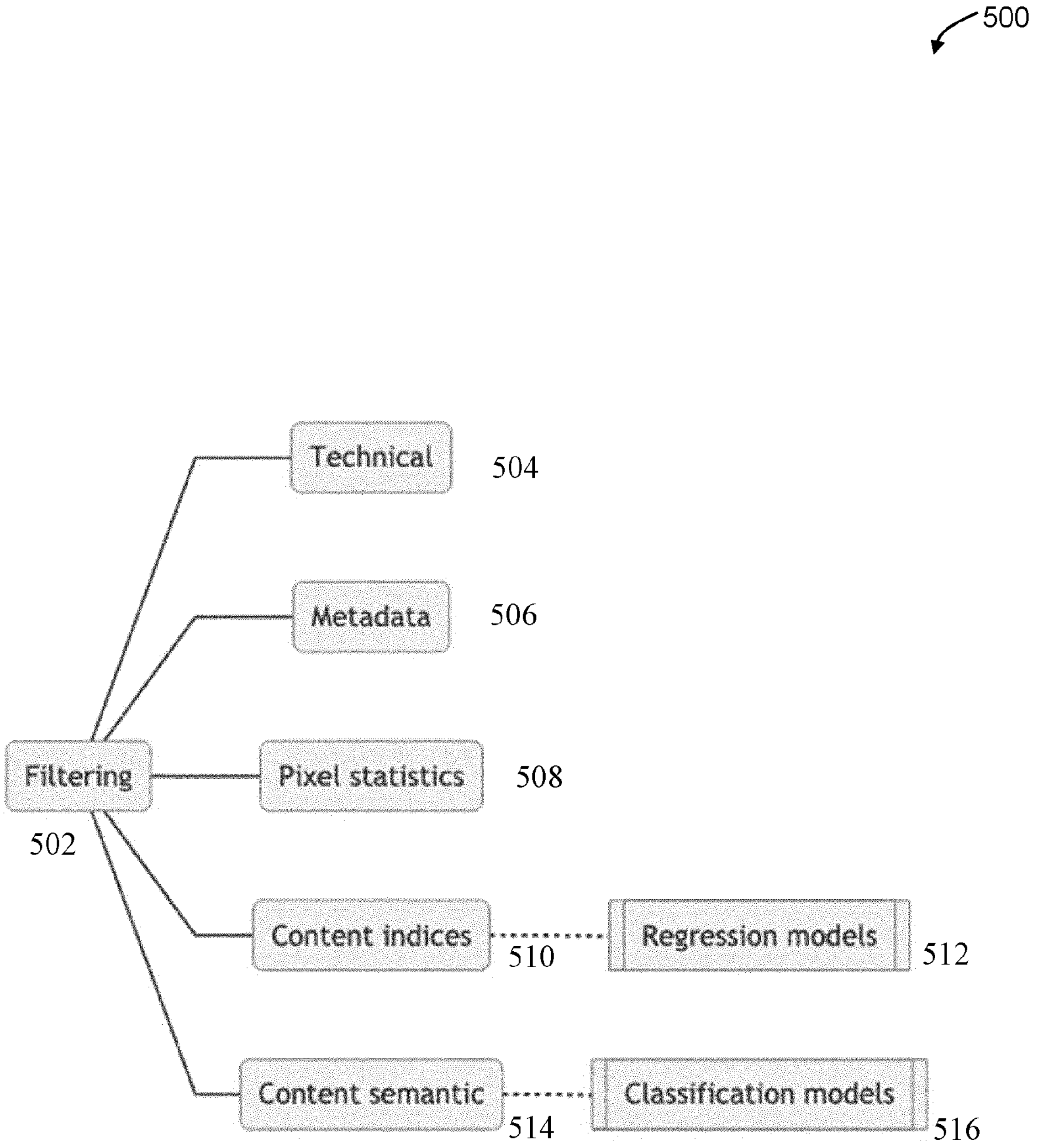
FIG. 5 illustrates block diagram depicting an example system 500 for automatic filtering of digital items for automatically generating a digital artifact with enhanced user experience, according embodiments of the present disclosure.

FIG. 5 illustrates block diagram depicting an example system 500 for automatic filtering of digital items for automatically generating a digital artifact with enhanced user experience, according to one exemplary embodiment. As depict in FIG. 5, a filter module 502 may receive an initial set of digital items (e.g., photos, images, pictures, videos, text files, etc.) from an initial digital items selection component (e.g., the initial digital items input/selection subsystem 110 of FIG. 1). The initial set of digital items may then be filtered by the technical filter component 504. The technical filter component 504 may filter the initial set of digital items based on the technical features associated with these digital items. For example, if a digital item is corrupted, then it may be filtered out from the initial set of digital items. In another example, if the digital item is a photo, and the photo has insufficient resolution, then this photo will be discarded by the technical filter component 504.

In some embodiments, alternatively or subsequently, the initial set of digital items may be filtered by the metadata filter component 506 based on the metadata associated with the digital items. Digital items that have been obtained from a source that is not desired to be a candidate to the resulting artifact may be filtered out based on the metadata associated with the digital items. For example, if the metadata associated with a digital item indicates that this digital item is received via a communication channel (e.g., via instant-messaging or media sharing application) instead of being produced locally by a user device, then the metadata filter component 506 may discard this digital item. This will allow the resulting artifact to focus on the story of this particular user associated with the user device, and filter out digital items (e.g., shared photos) received from another user (e.g., a friend). In some embodiments, the metadata filter component 506 may prompt a question to the user and ask whether to keep the digital items received from another source in this artifact. The response of the user may be labelled, and eventually become a tuning or training example for a machine learning (ML) model. For example, if a user is generating an artifact (e.g., a photo book) showing a story about a past trip, then generally the user does not want a photo of a friend's wedding received, during the time of the past trip, from a social media to be included in the resulting artifact. However, if a user is generating an artifact showing a story about the friendship between the user and a close friend, then generally the photos received via instant-messaging or photo-sharing application are desired to be included in the resulting artifact. Overtime, the ML model may be able to make the determination based on the purpose of the artifact, and no user input is needed.

In some embodiments, alternatively or subsequently, the initial set of digital items may be filtered by the pixel statistics filter component 508 based on pixel statistics associated with the digital items. In some embodiments, when the digital items are photos, the pixel statistics filter component 508 may extract statistics of the photos to analyze the pixel quality of the photos, such as brightness and/or contrast. When the brightness and/or contrast of a photo is outside of a predetermined threshold range, the pixel statistics filter component 508 may discard this photo.

In some embodiments, alternatively or subsequently, the content indices filter component 510 may filter the digital items based on the indices estimated on the digital items (e.g., pictures or photos). In some embodiments, Computer-Vision algorithms may be employed to access indices related to picture structure. The content indices filter component 510 may discard, based on these indices, bad quality pictures (e.g., technical beauty), blurry pictures, aesthetically undesirable pictures (e.g., ugly pictures), sentimentally undesirable pictures (e.g., bad feeling pictures). For example, a Mean opinion Score (MOS) representing the technical quality of the picture may be calculated and the content indices filter component 510 may determine whether to discard the photo based on this MoS score. In some embodiments, the content indices filter component 510 may be implemented by a Convolutional Neural Network (CNN) 512 and calculate a regression using the CNN 512. In some embodiments, the CNN 512 implemented in the content indices filter component 510 may calculate an aesthetic score associated with a photo. The content indices filter component 510 may determine whether to discard a photo based on the calculated aesthetic score of the photo. In some embodiments, the CNN 512 implemented in the content indices filter component 510 may calculate a colorfulness score (e.g., human perceived colorfulness) associated with a photo. A ML model may be employed to calculate this colorfulness score. In some embodiments, the CNN 512 implemented in the content indices filter component 510 may calculate a perceived blurriness score in pictures. In some embodiments, the blurriness determination may be implemented as a binary classification CNN. In some embodiments, a binary classification can be employed to exploit these indices in determining whether to keep or discard a photo or picture.

In some embodiments, alternatively or subsequently, the content semantic filter component 514 may filter the digital items based on the content semantic associated with the digital items. The content semantic filter component 514 may utilize Computer-Vision algorithms and ML algorithms to classify the contents of the digital items. In some embodiments, the classification models 516 may comprise the Computer-Vision algorithms and ML algorithms. The content semantic filter component 514 may first determine a semantic context based on the overall input digital items. For example, if the overall input digital items are mainly photos between a time range, and they indicate a trip, then the semantic context (e.g., theme) of the overall input digital items will be a trip story. The content semantic filter component 514 may then filter out the unrelated or non-compatible photos that happen to be taken during this time range based on the semantic content associated with each individual pictures. For example, photos that are groceries, furniture, or screenshots are generally not considered related to a trip, and thus should be discarded. In some embodiments, if the determined semantic context (e.g., theme) of the story is more than one, the system 100 may override the content semantic filter component 514 and filter out less photos. In some embodiments, a user may change the preset, and thus be able to include or exclude a certain class or classes of pictures. This preset feature may also evolve according to users' preferences and processed photo sets. In some embodiments, the picture content classification can be obtained via a CNN forward pass. The classification CNN may be trained using a mix of dataset used to define the needed picture classes. Some classes are considered discardable and associated to a discard option, other classes are associated to highlights (e.g., enhance user experience), other classes are used by other processing phases, such as the cover selection operation discussed elsewhere herein. Any number of checked pictures can be used to train the classification CNN. For example, at least a number of checked pictures on the order of 10, $10^2$, $10^3$, $10^4$, $10^5$, $10^6$, $10^7$, $10^8$, $10^9$, or more is used to train the classification CNN. In an example, over two (2) million manually checked pictures are currently used to train the classification CNN.

Figure 6:
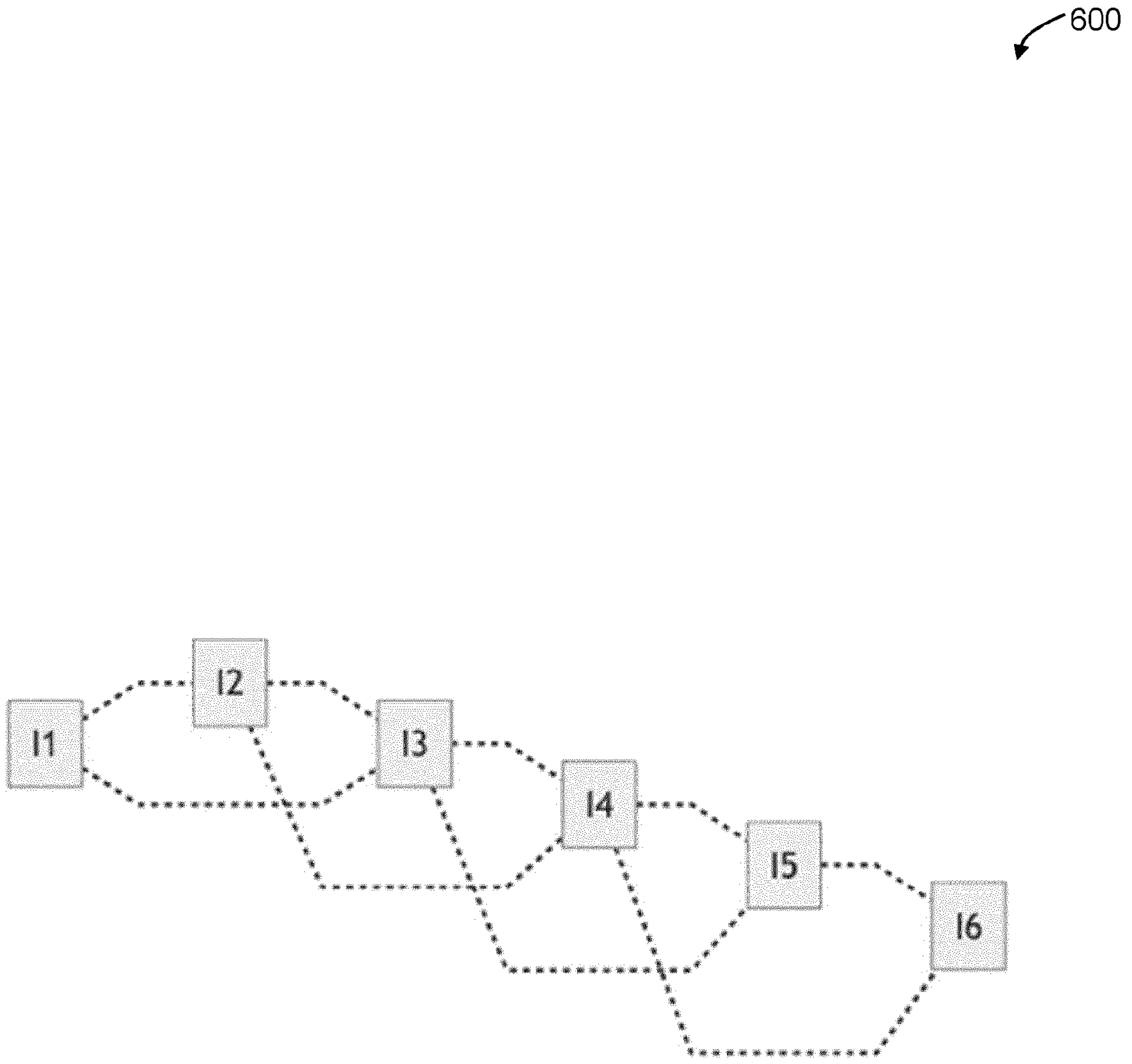
FIG. 6 illustrates a graph depicting an example sparse graph 600 for a similarity-based cluster operation so as to automatically generating a digital artifact with enhanced user experience, according to embodiments of the present disclosure.

FIG. 6 illustrates a graph depicting an example sparse graph 600 for a similarity-based cluster operation so as to automatically generating a digital artifact with enhanced user experience, according to one exemplary embodiment. Nowadays, the generation of digital items are convenient with low cost (such as shooting a photo with a mobile device), it is common for a user to generate a number of similar digital items of the same scene (e.g., multiple shots taken to ensure one of them with good quality). This introduces the need to identify the similar or near-similar picture clusters, and to select just one picture among them. The system 100 may define near-similar two pictures as that have been acquired with the intent of capturing a single shot, but executing many attempts for that. As depicted in FIG. 6, a sparse graph may be constructed. The pictures are represented by the graph nodes (e.g., I1, I2, I3, I4, I5, and I6 in FIG. 6). The edges connecting the nodes are on a quasi-contiguous graph, and can be filtered by means of a predicate. The edges considered in the quasi-contiguous graph can be selected as follows: pictures are considered in their sequence, those that are not distant more than a predefined number of hops are connected with an edge to be judged by the near-similarity predicate. The edges are added only between nodes associated to pictures that are considered near-similar. In FIG. 6, the structure of the graph with all possible edges inserted is depicted, in this case the maximal considered node distance is 2. The resulting binary predicate may be a Machine-Learning model (i.e., a binary classifier) trained on manually labeled data to catch human perception, and based on the picture-pair extracted features as its inputs. With the obtained graph shown in FIG. 6, near-similar clusters can be identified as the sets of pictures associated to nodes related to the connected components. In some cases, when using a probabilistic classifier, edges can be introduced with weights, and connected components can be discovered using a threshold on the total weight connecting a single picture to its cluster.

In some embodiments, the sparse graph 600 may also be employed to selected one or more digital items (e.g., photos) from the cluster. In some embodiment, the similarity-based cluster module 126 may select more than one photos from a set of near-similar cluster of pictures and discard the other pictures. In some other embodiments, the similarity-based cluster module 126 may select only one photos from a set of near-similar cluster of pictures and discard the other pictures. To this aim, different features may be computed on each picture-pair to rank the pictures. The considered features may include content-related indices (e.g., aesthetic, mean opinion score, colorfulness, brightness, blurriness). Moreover, the features may include pattern specific quantities (e.g., number of faces, quality of faces, captured saliency). The resulting classification algorithm can include a Machine-Learning model trained on manually labeled data to catch human perception, preference, and sentiment. It can also include user specific learnings based on user interactions (e.g. edit action or answer given) happened on previously generated digital artifacts. The ranking operation may be based on a "less than" operator, this can be implemented as a binary classifier, and the latter can be based on picture-pair features. To catch human preference, picture-pair features can be exploited in a ML model.

Figure 7A:
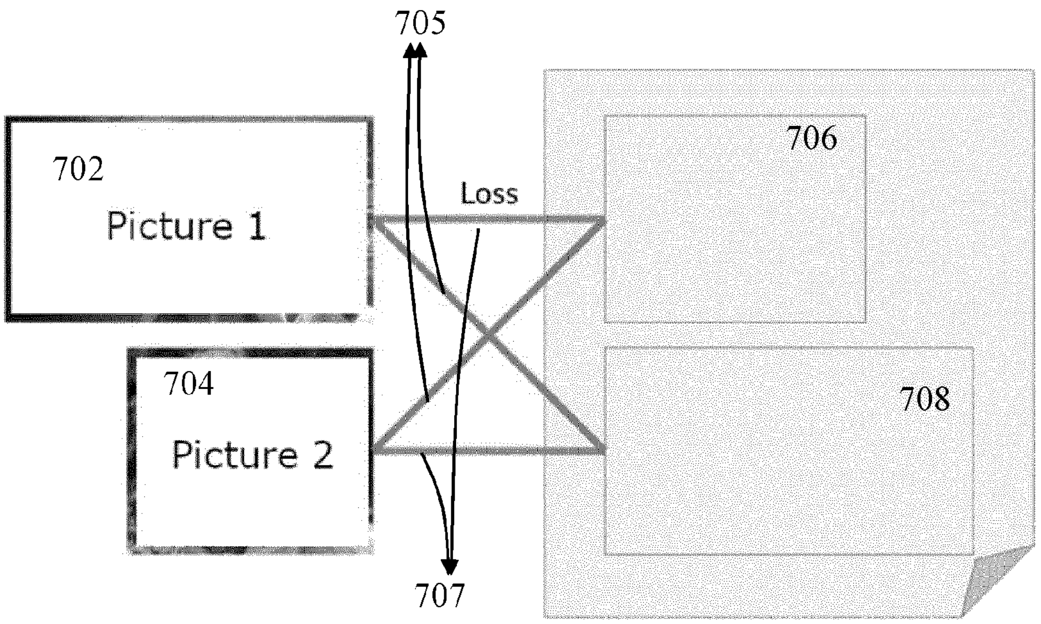
FIG. 7A illustrates a diagram depicting a layout operation so as to automatically generating a digital artifact with enhanced user experience, according to embodiments of the present disclosure.

FIG. 7A illustrates a diagram depicting a layout operation so as to automatically generating a digital artifact with enhanced user experience, according to one exemplary embodiment. In some embodiments, once the desired set of pictures to be placed in a page is obtained, the layout module 129 may select/generate a set of layouts having the right number of places to accommodate the desired set of pictures. The layout operation may be faced as an assignment problem, where every picture-to-place assignment induces a loss. In some embodiments, a loss function may be designed to consider, among others, one or more of a plurality of artifact characteristics. For example, the plurality of artifact characteristics may comprise the content importance of cropped picture parts, which can be accomplished through saliency maps estimated on pictures; the picture resolutions compared to page place sizes (pixel density); the affinity between contiguous pictures, which can be based on content, colors or other picture characteristics; the ordering of pictures in the page, e.g. the lexicographical order; or a combination thereof.

In some embodiments, the size of the picture may not necessarily be the same as the size of the place assigned to accommodate the picture. Therefore, the picture may need to be chopped. In some embodiments, a saliency-map may be computed to represent the particular portion in the picture that should be kept by weighting each pixel. For example, the saliency-map may consider multiple weighed terms. For example, the multiple weight terms may comprise a baseline uniform saliency value to prevent smaller crops to be preferred with respect to larger ones, which keeps as much of the user picture as possible; an attentive term weighting the most interesting parts of the picture; an objectness term identifying objects in the scene; a dedicated face term to consider cropped faces as a not-desired situation, or a combination thereof.

In some embodiments, ML algorithms may be employed to determine the cropping features based at least on the target size of the frame/slide/page-place to be filled. In some embodiments, when a layout is selected, the optimal assignment can be computed minimizing the total loss associated to picture-to-place assignments and neighboring pictures. As depicted in FIG. 7A, the two selected pictures picture 1 702 and picture 2 704 may be inserted in the two places 706 and 708 of the page in two possible assignments. The first assignment 705 indicates that picture 1 702 will go to place 708; and picture 2 704 will go to place 706. The second assignment 707 indicates that picture 1 702 will go to place 706; and picture 2 704 will go to place 708. In some embodiments, the total losses obtained for each assignment can be compared with each other to select the assignment with lower loss. The loss associated to the selected assignment is the loss of the actually considered layout. The same computation can be repeated on all the considered layouts until the layout with lower loss (i.e., the lowest loss when all the considered layouts are compared) can be selected as the best layout.

Figure 7B:
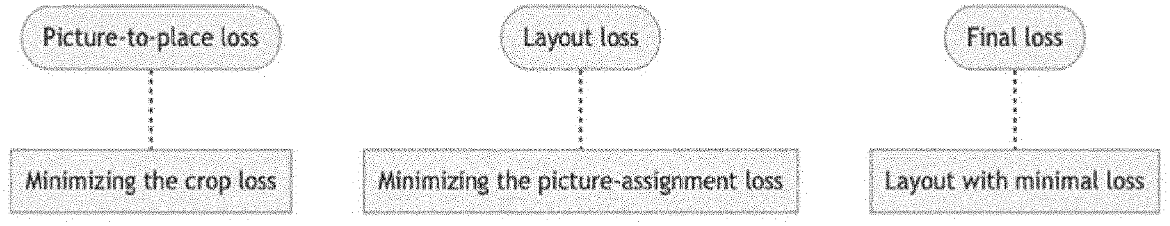
FIG. 7B illustrates a diagram schematizing the losses involved and the layout selection process, according to embodiments of the present disclosure.

FIG. 7B illustrates a diagram schematizing the losses involved and the layout selection process, according to one exemplary embodiment. In some embodiments, the picture-to-place loss is calculated and compared against each other to minimize the crop loss, as described elsewhere herein. In some other embodiments, the layout loss is calculated and compared against each other to minimize the picture-assignment loss, as described elsewhere herein. The final loss may be calculated (e.g., by adding the crop loss and picture-assignment loss) and compared against each other to select a layout with the minimum loss.

Computer Systems

Figure 8:
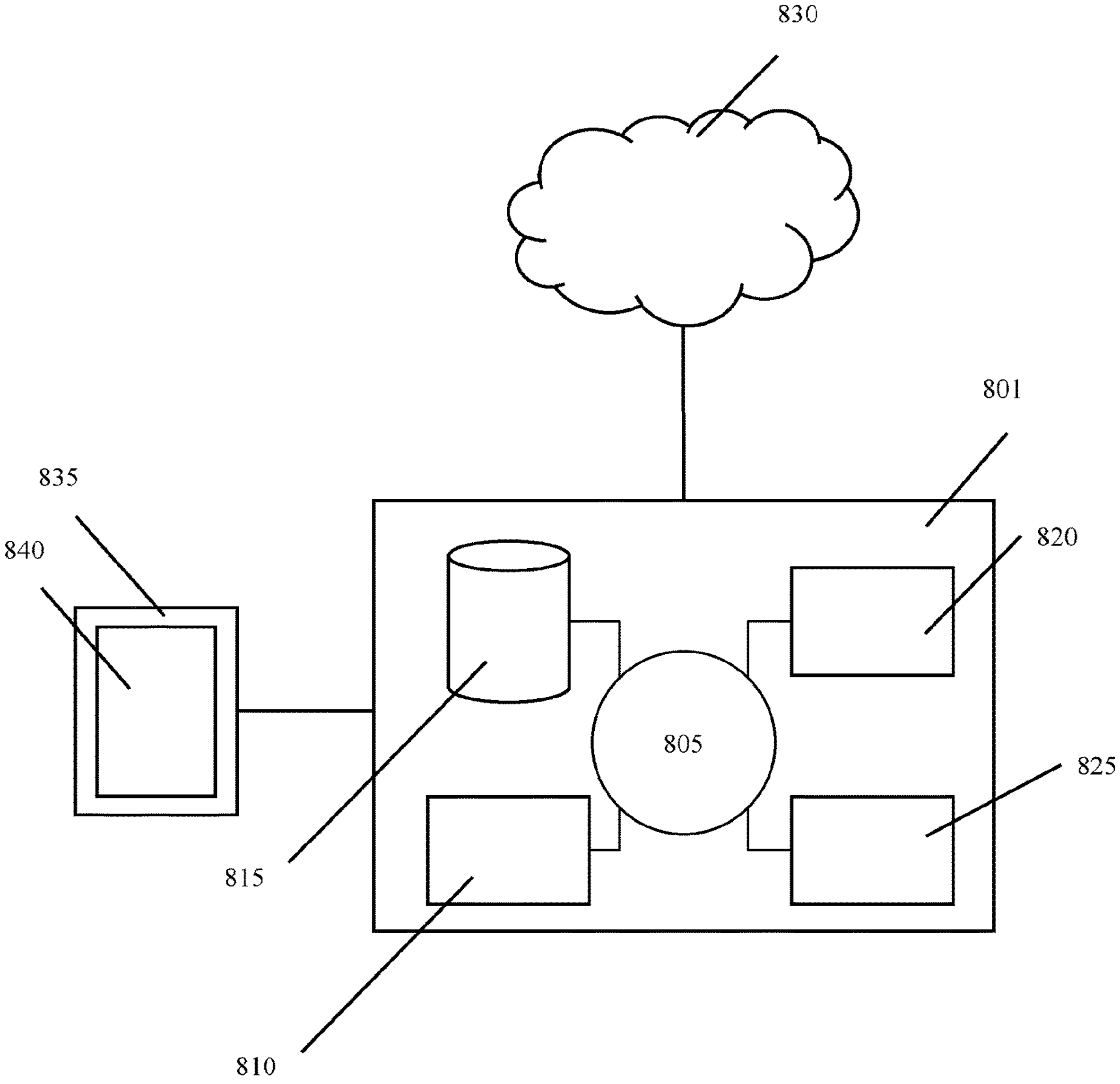
FIG. 8 illustrates a computer system that is programmed or otherwise configured to implement methods provided herein.

The present disclosure provides computer systems that are programmed to implement methods of the disclosure. FIG. 8 illustrates a computer system 801 that is programmed or otherwise configured to generate digital artifacts with enhanced user experience. The computer system 801 can be an electronic device of a user or a computer system that is remotely located with respect to the electronic device. The electronic device can be a mobile electronic device.

The computer system 801 includes a central processing unit (CPU, also "processor" and "computer processor" herein) 805, which can be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 1140 for providing, for example, a visualization of a generated digital artifact, or presenting a subset of the digital artifact during the time of digital artifact creation. Examples of UI's include, without limitation, a graphical user interface (GUI) and web-based user interface.

Methods and systems of the present disclosure can be implemented by way of one or more algorithms. An algorithm can be implemented by way of software upon execution by the central or graphic processing unit 805. The algorithm can, for example, automatically generate digital artifacts based on prior trainings.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a digital artifact, the method comprising:

(a) extracting, by one or more computer processors of a user device, metadata from a plurality of digital items;

(b) selecting, by the one or more computer processors, a subset of digital items from the plurality of digital items based at least in part on the extracted metadata;

(c) filtering, by the one or more computer processors, the subset of digital items based at least in part on a predetermined rule;

(d) estimating, by the one or more computer processors, a parameter associated with a set of resulting digital items for the digital artifact;

(e) decimating, by the one or more computer processors, the subset of digital items filtered in (c), based at least in part on the parameter associated with the set of resulting digital items and a respective quality assessment of each of the filtered subset of digital items;

(f) presenting, by the one or more computer processors, a subset of the digital artifact to a user on the user device, wherein a response of the user is solicited when presenting the subset of the digital artifact to the user; and (g) generating, by the one or more computer processors, the digital artifact by arranging a remainder of digital items from the plurality of digital items based at least in part on a preselected layout, and presenting the digital artifact to a user on a display of the user device, wherein (i) the subset of the digital artifact generated in (f) is presented to the user on the user device and (ii) the response of the user is solicited and received prior to a completion of (g), and wherein the digital artifact is dynamically adapted based at least in part on the response of the user received in (f).

2. The method of claim 1, further comprising transmitting an interactive unit to the user to solicit an additional user response after the digital artifact is generated in (g).

3. The method of claim 2, further comprising altering the digital artifact based on the additional user response.

4. The method of claim 1, wherein the extracted metadata comprises a timestamp.

5. The method of claim 1, wherein the extracted metadata comprises a location.

6. The method of claim 1, wherein one or more machine learning algorithms are employed to perform one or more of (a)-(g).

7. The method of claim 1, wherein the user device is a mobile device, a hard drive, a digital camera, a television, a computer, a computer system, a tablet device, a cloud platform, or a third party platform or service.

8. The method of claim 1, wherein the plurality of digital items comprises a plurality of image files, a plurality of audio files, a plurality of video files, or a combination thereof.

9. The method of claim 1, further comprising clustering the plurality of digital items based at least in part on a similarity between each of the plurality of digital items.

10. The method of claim 1, wherein the extracted metadata comprises one or more faces, shapes, objects, or a combination thereof.

11. The method of claim 1, wherein the extracted metadata comprises a visual pattern.

12. The method of claim 1, wherein the digital artifact is a digital photobook.

13. A computer system for generating a digital artifact, comprising: one or more processors, individually or collectively, configured to:

(a) extract metadata from a plurality of digital items;

(b) select a subset of digital items from the plurality of digital items based at least in part on the extracted metadata;

(c) filter the subset of digital items based at least in part on a predetermined rule;

(d) estimate a parameter associated with a set of resulting digital items for the digital artifact;

(e) decimate the subset of digital items filtered in (c), based at least in part on the parameter associated with the set of resulting digital items and a respective quality assessment of each of the filtered subset of digital items;

(f) present a subset of the digital artifact to a user on the user device and solicit a response of the user when presenting the subset of the digital artifact to the user; and (g) generate the digital artifact by arranging a remainder of digital items from the plurality of digital items based at least in part on a preselected layout, and present the digital artifact to the user on a display of the user device, wherein (i) the subset of the digital artifact generated in (f) is presented to a user on the user device and (ii) the response of the user is solicited and received prior to a completion of (g), and wherein the digital artifact is dynamically adapted based at least in part on the response of the user received in (f).

14. The computer system of claim 13, wherein the one or more processors are further configured to transmit an interactive unit to the user to solicit an additional user response after the digital artifact is generated in (g).

15. The computer system of claim 14, wherein the one or more processors are further configured to alter the digital artifact based on the additional user response.

16. The computer system of claim 13, wherein the extracted metadata comprises a timestamp.

17. The computer system of claim 13, wherein the extracted metadata comprises a location.

18. The computer system of claim 13, wherein one or more machine learning algorithms are employed to perform one or more of (a)-(g).

19. The computer system of claim 13, wherein the user device is a mobile device, a hard drive, a digital camera, a television, a computer, a computer system, a tablet device, a cloud platform, or a third party platform or service.

20. The computer system of claim 13, wherein the plurality of digital items comprises a plurality of image files, a plurality of audio files, a plurality of video files, or a combination thereof.

21. The computer system of claim 13, wherein the one or more processors are further configured to cluster the plurality of digital items based at least in part on a similarity between each of the plurality of digital items, and wherein the extracted metadata comprises one or more faces, shapes, objections, or a combination thereof.

22. The computer system of claim 13, wherein the digital artifact is a digital photobook.

* * * * *